(12) United States Patent
Nakamura et al.

(10) Patent No.: US 8,818,979 B2
(45) Date of Patent: Aug. 26, 2014

(54) DOCUMENT RETRIEVING APPARATUS AND DOCUMENT RETRIEVING METHOD

(75) Inventors: Tatsuo Nakamura, Tokyo (JP); Yoshio Takaeda, Tokyo (JP)

(73) Assignee: Valuenex Consulting Inc., Tokyo (JP)

( * ) Notice: Subject to any disclaimer, the term of this patent is extended or adjusted under 35 U.S.C. 154(b) by 604 days.

(21) Appl. No.: 12/600,573

(22) PCT Filed: May 15, 2008

(86) PCT No.: PCT/JP2008/058901
§ 371 (c)(1),
(2), (4) Date: Nov. 17, 2009

(87) PCT Pub. No.: WO2008/143116
PCT Pub. Date: Nov. 27, 2008

(65) Prior Publication Data
US 2010/0153356 A1    Jun. 17, 2010

(30) Foreign Application Priority Data
May 17, 2007 (JP) ................................. 2007-131620

(51) Int. Cl.
*G06F 17/30* (2006.01)

(52) U.S. Cl.
USPC ........... 707/706; 707/707; 707/749; 707/769; 707/784

(58) Field of Classification Search
USPC ............. 707/769, 784, 999.04, 706, 707, 749
See application file for complete search history.

(56) References Cited

U.S. PATENT DOCUMENTS

| 5,847,708 | A | 12/1998 | Wolff |
| 6,523,026 | B1 * | 2/2003 | Gillis .................................... 1/1 |
| 7,089,226 | B1 * | 8/2006 | Dumais et al. ................ 707/740 |
| 7,185,001 | B1 * | 2/2007 | Burdick et al. ........................ 1/1 |
| 7,283,997 | B1 * | 10/2007 | Howard et al. ........................ 1/1 |
| 7,660,822 | B1 * | 2/2010 | Pfleger ................... 707/999.107 |
| 2001/0011283 | A1 * | 8/2001 | Kato et al. ..................... 707/511 |
| 2003/0093421 | A1 * | 5/2003 | Kimbrough et al. .............. 707/3 |

(Continued)

FOREIGN PATENT DOCUMENTS

| JP | 10-116296 A | 5/1998 |
| JP | 11-175535 A | 7/1999 |

(Continued)

OTHER PUBLICATIONS

International Search Report of PCT/JP2008/058901, mailing date of Jun. 24, 2008.

*Primary Examiner* — Noosha Arjomandi
(74) *Attorney, Agent, or Firm* — Westerman, Hattori, Daniels & Adrian, LLP (57) ABSTRACT

A document retrieving apparatus can retrieve a target document and output the retrieved target documents according to ranking when a retrieval keyword or retrieval expression is input. However, it requires a skilful technique to narrow a retrieval range since an appropriate retrieval keyword or retrieval expression needs to be created. A document retrieving apparatus of the present invention reads out and compiles a document list included in a designated area when a user designates an area of a document to be read on a two-dimensional map. When the user designates an area of a document to be read on the two-dimensional map, the document retrieving apparatus of the present invention combines query vectors of a plurality of documents included in a designated area and extracts documents based on a combined query vector.

3 Claims, 8 Drawing Sheets

(56) References Cited

U.S. PATENT DOCUMENTS

| | | | |
|---|---|---|---|
| 2005/0149516 A1* | 7/2005 | Wolf et al. | 707/3 |
| 2005/0203889 A1* | 9/2005 | Okubo et al. | 707/3 |
| 2006/0053176 A1 | 3/2006 | Thorpe et al. | |
| 2006/0155725 A1* | 7/2006 | Foster et al. | 707/100 |
| 2006/0218137 A1* | 9/2006 | Inaba et al. | 707/5 |
| 2006/0242190 A1* | 10/2006 | Wnek | 707/102 |
| 2007/0250855 A1* | 10/2007 | Quinn-Jacobs et al. | 725/35 |
| 2008/0244429 A1* | 10/2008 | Stading | 715/764 |
| 2008/0288255 A1* | 11/2008 | Carin et al. | 704/256.1 |

FOREIGN PATENT DOCUMENTS

| | | |
|---|---|---|
| JP | 2002-015001 A | 1/2002 |
| JP | 2002-073680 A | 3/2002 |
| JP | 2003-345811 A | 12/2003 |
| JP | 2005-043987 A | 2/2005 |
| JP | 2006-127484 A | 5/2006 |

* cited by examiner

- DOCUMENT VECTOR
- ◎ COMBINED QUERY VECTOR

80: LASER THERAPY APPARATUS

FIG. 9

- DOCUMENT VECTOR
- ◎ COMBINED QUERY VECTOR

DOCUMENT RETRIEVING APPARATUS AND DOCUMENT RETRIEVING METHOD

TECHNICAL FIELD

The present invention relates to a document retrieving apparatus and a document retrieving method, and more particularly, to a document retrieving apparatus and a document retrieving method in which the retrieval is performed by further narrowing an area of retrieved documents.

BACKGROUND ART

When a search keyword or a search expression is input, a document retrieving apparatus retrieves target documents and outputs retrieved documents according to ranking (for example, see Patent Document 1). It is difficult for a user to read all of many documents obtained as a retrieval result. In order to rapidly understand a summary of contents of many obtained documents (a document set), a technique of plotting each document included in the document set on two-dimensional coordinates has been suggested (for example, see Patent Document 2).

Patent Document 1: Japanese Patent Application Laid-Open No. 2005-43987
Patent Document 2: Japanese Patent Application Laid-Open No. 2003-345811
Patent Document 3: Japanese Patent Application Laid-Open No. 2002-015001

DISCLOSURE OF INVENTION

Technical Problem

Conventionally, in order to further narrow a retrieval range of the retrieved documents, it was needed to revise a search keyword or a search expression which was initially input and input a new search keyword or search expression.

However, it requires a skilful technique to narrow the retrieval range since an appropriate search keyword or search expression needs to be created. It is difficult to a user who is not familiar with the retrieval to create an appropriate search keyword or search expression, and thus a long time and many efforts of extracting a target document were required.

In view of the above circumstances, and it is an object of the present invention to provide a document retrieving apparatus and a document retrieving method in which a retrieval range can be narrowed by a simple operation, or a target document can be retrieved in a short time.

Solution to Problem

In order to achieve the object, when a user designates an area of a document to be read on a two-dimensional map, a document retrieving apparatus of the present invention reads out and compiles a document list included in the designated area and extracts documents based on the compiled result.

More specially, a document retrieving apparatus according to the present invention includes an area information detector which detects area information representing a designated area on a displayed map; a document list reader which reads out a document list which is a list of documents corresponding to plots included in the area on the map from the area information detected by the area information detector; an in-area information compiler which compiles bibliographic information of each document included in the document list read by the document list reader; and a search engine which performs document extraction based on a compiling result compiled through the in-area information compiler.

The document retrieving apparatus of the present invention can narrow a retrieval range by a simple operation and extract a target document in a short time.

In order to achieve the object, when a user designates an area of a document to be read on a two-dimensional map, a document retrieving apparatus according to the present invention combines query vectors of a plurality of documents included in the designated area and extracts documents based on a combined query vector.

More specially, a document retrieving apparatus according to the present invention includes an area information detector which detects area information representing a designated area on a displayed map; a document list reader which reads out a document list which is a list of documents corresponding to plots included in the area on the map from the area information detected by the area information detector; and a search engine which reads out document vectors corresponding to each document included in the document list read by the document list reader from an information database in which document vectors are previously computed and registered, combines all of the read document vectors corresponding to the document into one combined query vector, compares the combined query vector with the document vector in the information database, and extracts the compared document vectors in an order closest to the combined query vector.

The document retrieving apparatus of the present invention can narrow a retrieval range by a simple operation and extract a target document in a short time.

In the document retrieving apparatus according to the present invention, the search engine may extract document vectors of a previously set number.

In the document retrieving apparatus according to the present invention, the search engine may previously set a threshold of similarity representing closeness between the document vector and the combined query vector and extract a document vector which is larger than the previously set threshold.

Similarity is expressed by a scalar product value between document vectors of documents which are desired to be compared, an index computed by multiplying a scalar product value by each document length, the number of a word which is in common between documents which are desired to be compared, or the number of times in which a common word appears in a document.

A size of similarity indicates commonality or similarity of a content between documents which are desired to be compared and is quantitatively expressed by the similarity described above. The closer the document vectors of the documents to be compared, the higher the similarity between the document vectors.

Preferably, the document retrieving apparatus according to the present invention further includes a two-dimensional map creator which plots each document in advance so that similar documents are disposed adjacent to each other on the displayed map in which the area information is detected by the area information detector. Since similar documents are disposed adjacent to each other on the two-dimensional map, the user can very easily select one or more appropriate documents to be selected for the retrieval with the narrowed range. Therefore, a skilful technique is not necessary, and the accuracy and productivity of the retrieval can be improved. The displayed map is preferably a radar chart. For example, as the radar chart, one in which documents having high similarity to retrieval target information such as an input query among retrieved documents are plotted close to an original point, and the lower the similarity, the further the document is apart from the original point may be employed. Due to such visual expression through the radar chart, the user can easily grasp a distance sense between retrieval target information and each document and a distance sense between the respective documents with high accuracy.

The document retrieving apparatus according to the present invention preferably further includes a display engine which creates a two-dimensional map in which document vectors extracted by the search engine are two-dimensionally disposed centering on the combined query vector combined by the search engine. The user can easily grasp a location relationship of extracted documents on the two-dimensional map.

To achieve the object, a document retrieving method according to the present invention reads out and compiles a document list included in a designated area and extracts a document based on the compiled result.

More specially, a document retrieving method according to the present invention includes: an area information detection step of detecting area information representing a designated area on a displayed map; a document list reading step of reading out a document list which is a list of documents corresponding to plots included in the area on the map from the area information detected in the detecting of the area information detection step; a document compiling step of compiling bibliographic information of each document included in the document list read in the document list reading step; and a retrieval document extraction step of performing document extraction based on a compiled result.

The document retrieving method of the present invention can narrow a retrieval range by a simple operation and extract a target document in a short time.

To achieve the object, the document retrieving method of the present invention combines query vectors of a plurality of documents included in a designated area and extracts documents based on a combined query vector.

More specially, a document retrieving method according to the present invention includes an area information detection step of detecting area information representing a designated area on a displayed map; a document list reading step of reading out a document list which is a list of documents corresponding to plots included in the area on the map from the area information detected in the area information detection step; a document vector reading step of reading out document vectors corresponding to each document included in the document list read in the document list reading step from an information database in which document vectors are previously computed and registered; a query vector combination step of combining all of document vectors which are read in the document vector reading step and correspond to the document into one combined query vector; a combination vector comparison step of comparing the combined query vector combined in the query vector combination step with the document vector in the information database; and a retrieval document extraction step of extracting the document vectors compared in the combination vector comparison step in an order closest to the combined query vector.

The document retrieving method of the present invention can narrow a retrieval range by a simple operation and extract a target document in a short time.

In the document retrieving method according to the present invention, the retrieval document extraction step may include extracting document vectors of a previously set number.

In the document retrieving method according to the present invention, the extracting of the document vectors in the retrieval document extraction step may include previously setting a threshold of similarity representing closeness between the document vector and the combined query vector and extracting a document vector which is larger than the previously set threshold.

The document retrieving method according to the present invention preferably further includes: a two-dimensional map creation step of plotting each document in advance so that similar documents are disposed adjacent to each other, before the area information detection step. Since similar documents are disposed adjacent to each other on the two-dimensional map, user can very easily select one or more appropriate documents to be selected for the retrieval with the narrowed range. Therefore, a skilful technique is not necessary, and the accuracy and productivity of the retrieval can be improved. The two-dimensional map creation step preferably includes creating a radar chart.

The document retrieving method according to the present invention preferably further includes a two-dimensional map creation step of creating a two-dimensional map in which document vectors extracted in the retrieval document extraction step are two-dimensionally disposed centering on the combined query vector combined in the QUERY vector combination step.

The present invention also provides a document retrieving computer program for executing the document retrieving method described above in a computer.

The present invention also provides a computer readable recording medium recording a document retrieving computer program for executing the document retrieving method in a computer.

Advantageous Effects of the Invention

The present invention can provide a document retrieving apparatus and a document retrieving method in which a retrieval range can be narrowed by a simple operation, and a target document can be retrieved in a short time.

REFERENCE SIGNS LIST

11: Document retrieving apparatus
12, 12a, 12b: Terminal apparatus
13: Communication network 21: Search engine
22: Two-dimensional map creator
23: Area information detector
24: Document list reader
25: In-area information compiler
27: Document display controller
31: Dictionary database
32: Information database

BEST MODE FOR CARRYING OUT THE INVENTION

Hereinafter, embodiment of the present invention will be described with the accompanying drawings. Embodiments described below are configuration examples of the present invention, and the present invention is not limited to embodiments described below. In the description and drawings, like parts are denoted by like reference numerals.
(Document Retrieving System and Document Retrieving Method)

Figure 6:
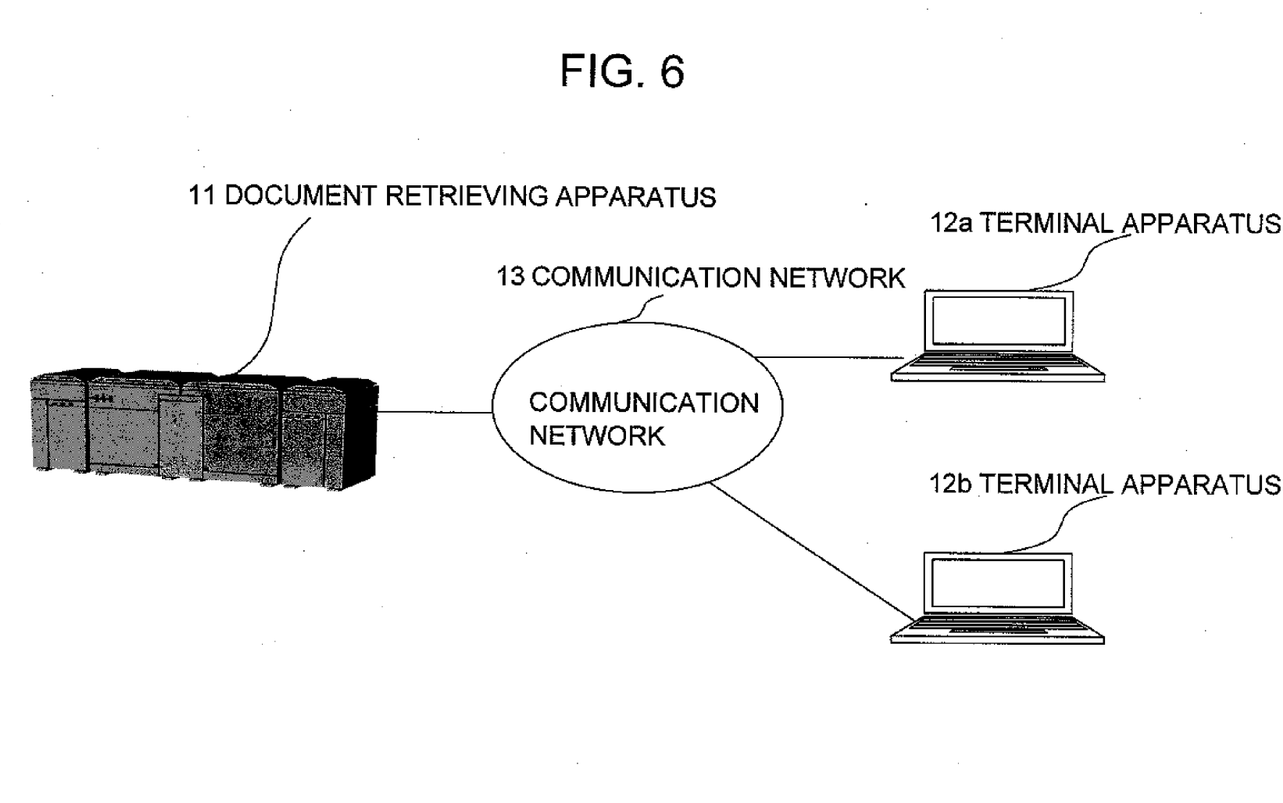
FIG. 6 is a view for explaining a configuration of a document retrieving system according to an embodiment of the present invention.

Hereinafter, embodiments of the present invention will be described with reference to the accompanying drawings. FIG. 6 is a view illustrating a configuration of a document retrieving system according to an embodiment of the present embodiment. The document retrieving system includes a document retrieving apparatus 11 and terminal apparatuses 12a and 12b. The terminal apparatuses 12a and 12b are connected to the document retrieving apparatus 11 via a communication network 13, and give an instruction to the document retrieving apparatus 11 or display retrieved contents. In FIG. 6, the number of the terminal apparatuses is two, that is, the terminal apparatuses 12a and 12b, but it may be one, or two or more. A terminal apparatus 12 is used as a collective term of the terminal apparatus 12a and the terminal apparatus 12b.

Figure 7:
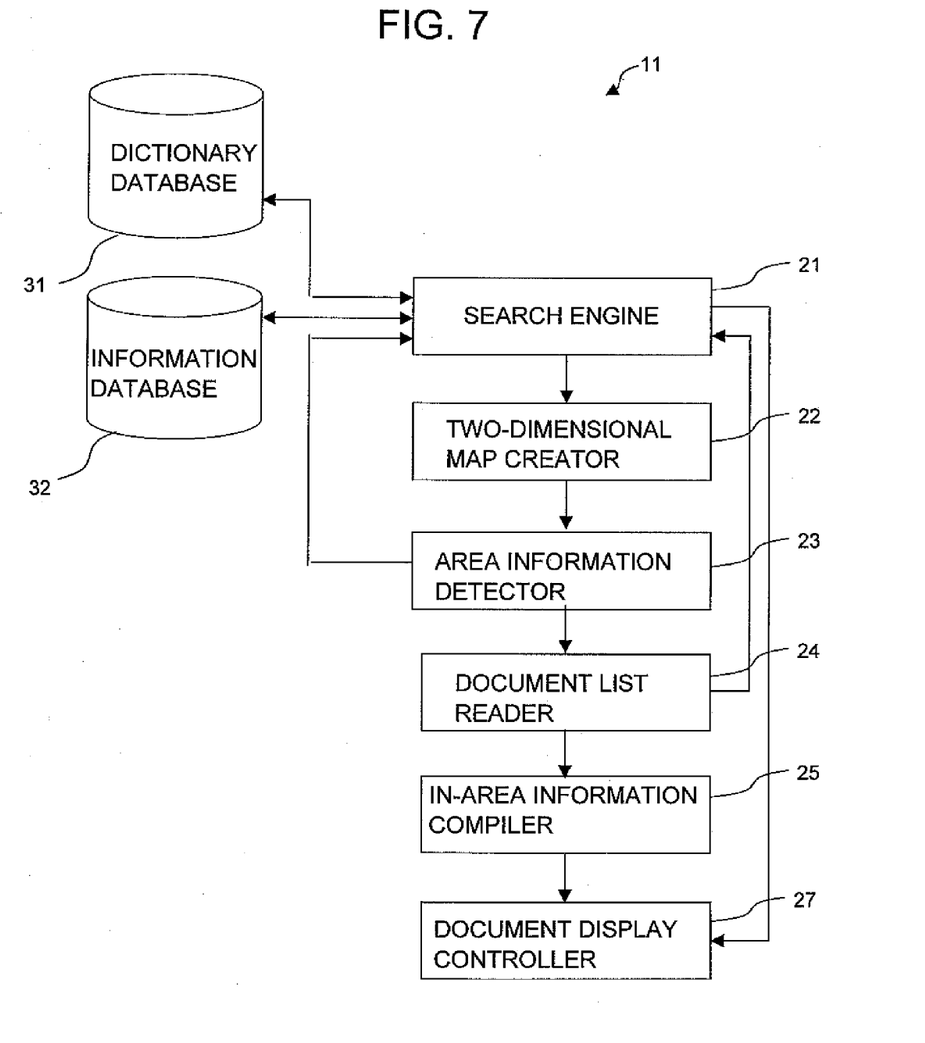
FIG. 7 is a view for explaining a configuration of the document retrieving apparatus.

FIG. 7 illustrates a configuration of the document retrieving apparatus 11. The document retrieving apparatus 11 includes a search engine 21, a two-dimensional map creator 22, an area information detector 23, a document list reader 24, an in-area information compiler 25, a document display controller 27, a dictionary database 31, and an information database 32.

In FIG. 7, the dictionary database 31 is a database in which word information for writing in parts a sentence into words is registered. The information database 32 is a database in which information of a retrieval target is registered. The retrieval may be performed using attribute data or indexing data associated with each information. The search engine 21 is an engine which extracts information input by a user, that is, information related to a query such as a keyword, a sentence, and an information retrieval number from the information database 32. The two-dimensional map creator 22 expresses an extracted result on a two-dimensional map (a radar chart in the embodiment) in which positioning is performed according to a degree of relevance. The area information detector 23 detects an area of the two-dimensional map designated by an input device such as a mouse. The document list reader 24 reads out a document included in the designated area on the two-dimensional map. The in-area information compiler 25 compiles attribute information associated with the read document. The document display controller 27 performs control for displaying the compiled attribute information on a screen.

An operation of the document retrieving system and the document retrieving apparatus 11 will be described with reference to FIGS. 1 and 6. FIG. 6 is a view illustrating a configuration of the document retrieving system. The terminal apparatus 12 starts an operation of the document retrieving apparatus 11 via the communication network 13 (start step S101). A public network, an Internet, or a local area network (LAN) may be used as the communication network 13. The terminal apparatus 12 may have direct access to the document retrieving apparatus 11.

Figure 1:
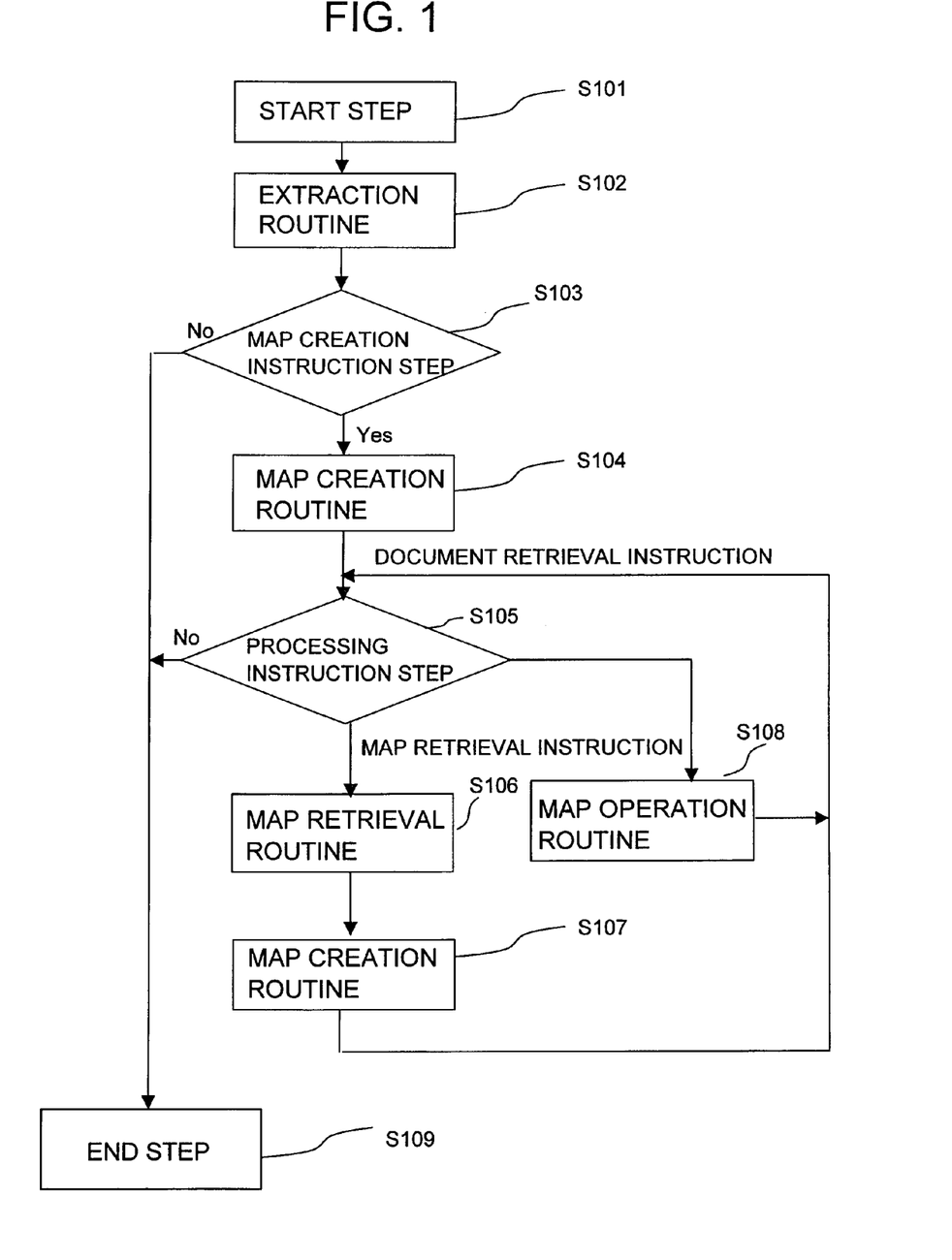
FIG. 1 is a view illustrating an operation of a document retrieving apparatus according to an embodiment of the present invention.

FIG. 1 is a view illustrating an operation of the document retrieving apparatus. In FIG. 1 or 6, the document retrieving apparatus 11 which has received a start instruction proceeds to extraction routine S102 of being instructed to retrieve a retrieval document as a retrieval target from the terminal apparatus 12, extracting documents having high similarity to the retrieval document, and displaying the extracted documents. When there is no map creation instruction from the terminal apparatus 12 (map creation instruction step S103), the document retrieving apparatus 11 ends processing routine and waits for a new instruction (end step S109). However, when there is a map creation instruction from the terminal apparatus 12 (map creation instruction step S103), the document retrieving apparatus 11 proceeds to map creation routine S104 of mapping a plurality of extracted documents on a two-dimensional map. Next, the document retrieving apparatus 11 proceeds to next step according to a processing instruction (processing instruction step S105) from the terminal apparatus 12. When there is an end instruction from the terminal apparatus 12, the document retrieving apparatus 11 ends processing routine and waits for a new instruction (end step S109). When receiving a document retrieval instruction from the terminal apparatus 12, the document retrieval apparatus 11 proceeds to map operation routine S108 of displaying bibliographic information of a document present in a designated area on the two-dimensional map. After displaying the bibliographic information, the document retrieving apparatus 11 waits for a processing instruction from the terminal apparatus 12 (processing instruction step S105). When receiving a map retrieval instruction from the terminal apparatus 12, the document retrieving apparatus 11 proceeds to map retrieval routine S106 of combining query vectors of a plurality of documents present in the designated area on the two-dimensional map, newly extracting documents, and displaying the bibliographic information of the extracted documents. The document retrieving apparatus 11 proceeds to map creation routine S107 of mapping the plurality of extracted documents on the two-dimensional map. After mapping the documents, the document retrieving apparatus 11 waits for a processing instruction from the terminal apparatus 12 (processing instruction step S105). The document retrieving apparatus 11 proceeds to a next step according to a processing instruction from the terminal apparatus 12.
(Extraction Routine)

Figure 2:
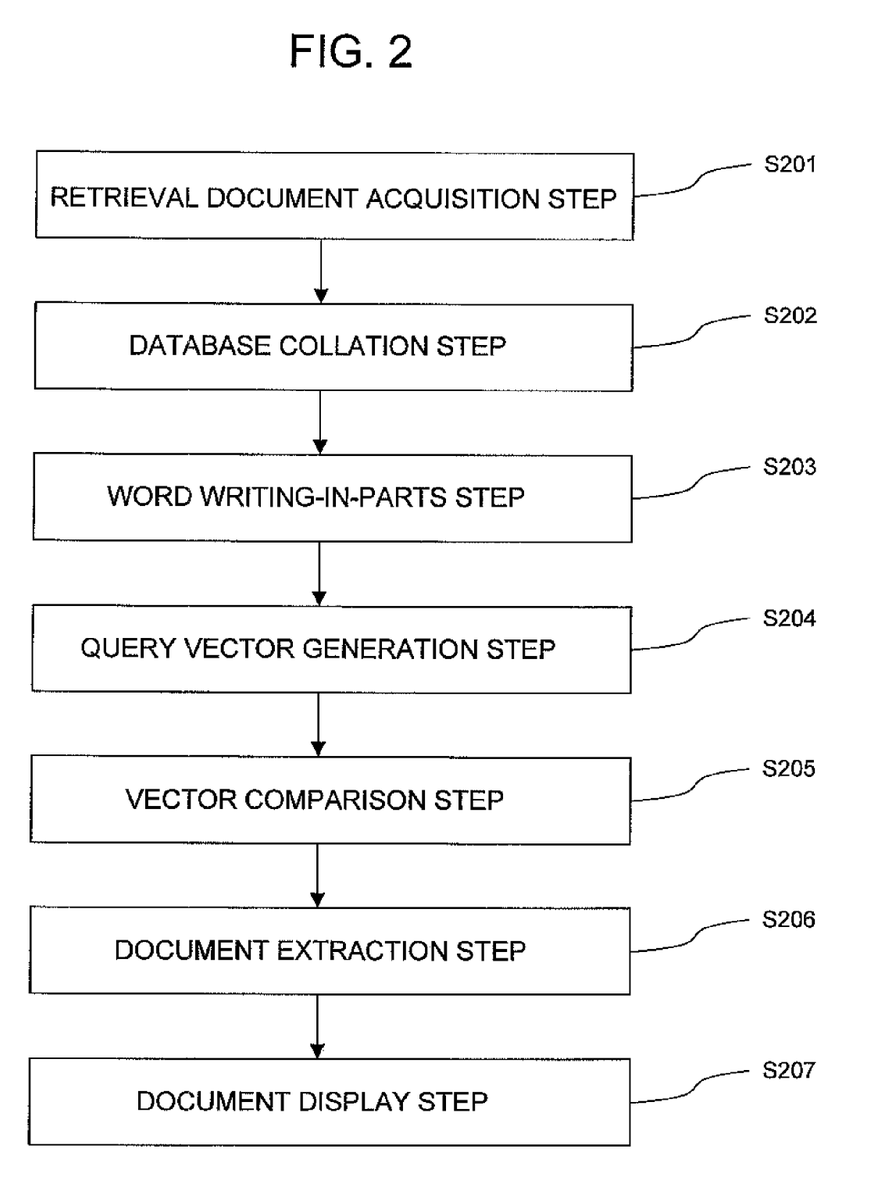
FIG. 2 is a view for explaining an extraction routine of the document retrieving apparatus.

Respective steps of extraction routine S102 of FIG. 1 will be described with reference to FIGS. 2 and 7. When a user inputs a retrieval document as a retrieval target from the terminal apparatus, the search engine 21 acquires the retrieval document (retrieval document acquisition step S201). The search engine 21 collates the acquired retrieval document with the dictionary database 31 (database collation step S202) and writes in parts a sentence of the acquired retrieval document in unit of words (word writing-in-parts step S203). The search engine 21 computes a degree of importance of each word wrote in parts and generates a query vector of the retrieval document (query vector generation step S204). The degree of importance of the word is, for example, a value determined based on the frequency of appearance in the document. A word which appears in one document many times and which appears in only some documents is high in degree of importance. The degree of importance may be determined based on the meaning which a part of speech or a word itself has. The search engine 21 sequentially compares the generated query vectors with document vectors of the information database 32 which are previously computed and registered (vector comparison step S205) and extracts documents corresponding to the document vectors of the previously set number in an order in which a direction of the document vector is close to the generated query vector. Alternatively, the search engine 21 sets a threshold of similarity representing closeness between the document vector and the generated query vector in advance and extracts documents corresponding to the document vector which is larger than the previously set threshold (document extraction step S206). When extracting the documents corresponding to the document vector close to the query vector, the documents are extracted by using information registered in the information database such as a keyword, a combination of keywords, and the presence of an information number, and a number list of the extracted documents is created. The document display controller 27 displays the bibliographic information of the document corresponding to the extracted document vector (document display step S207). In the case of a patent document, the bibliographic information includes, for example, a patent number, data information such as a filing date of application date and a publication date, an applicant, an inventor, a summary, a classification number such as IPC or an F term, and a reference. In the case of a technical document or a technical magazine, the bibliographic information includes, for example, a title, a writer, an organization which a writer belongs to, an issue date, a summary, a technical field, a related keyword, and a reference.

(Map Creation Routine)

Figure 3:
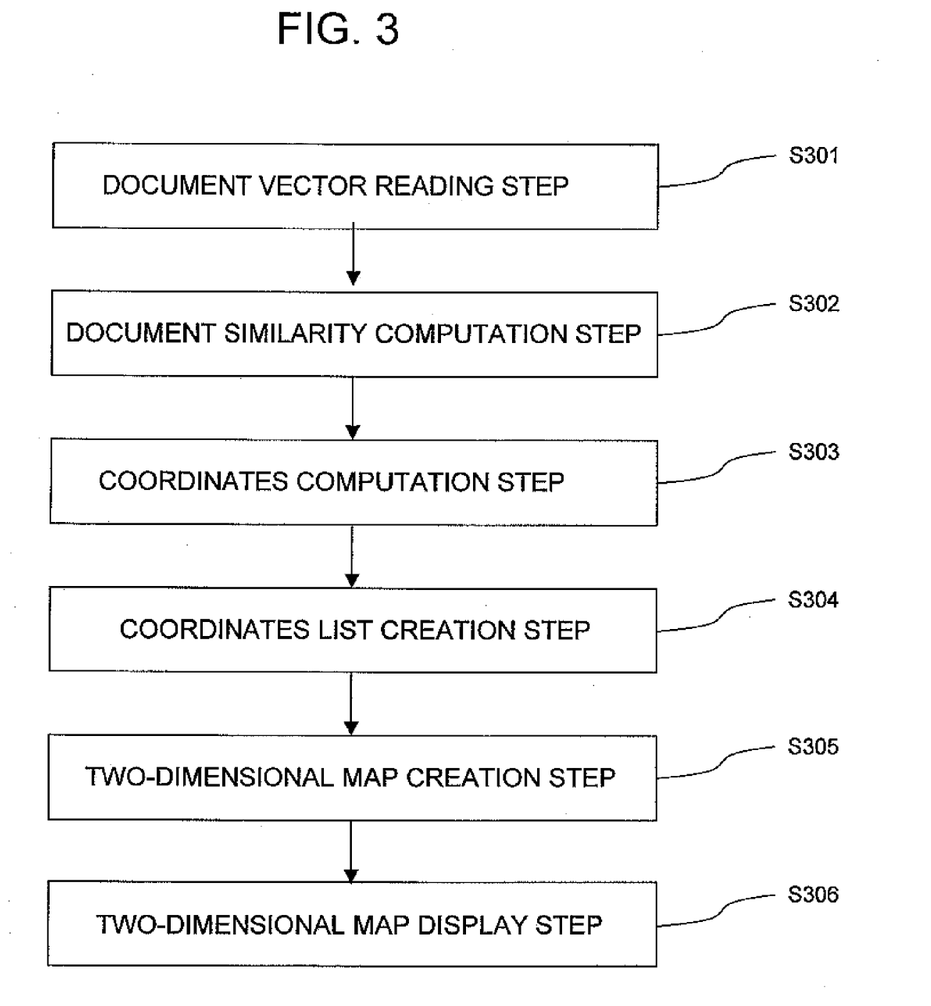
FIG. 3 is a view for explaining a map creation routine of the document retrieving apparatus.
Figure 8:
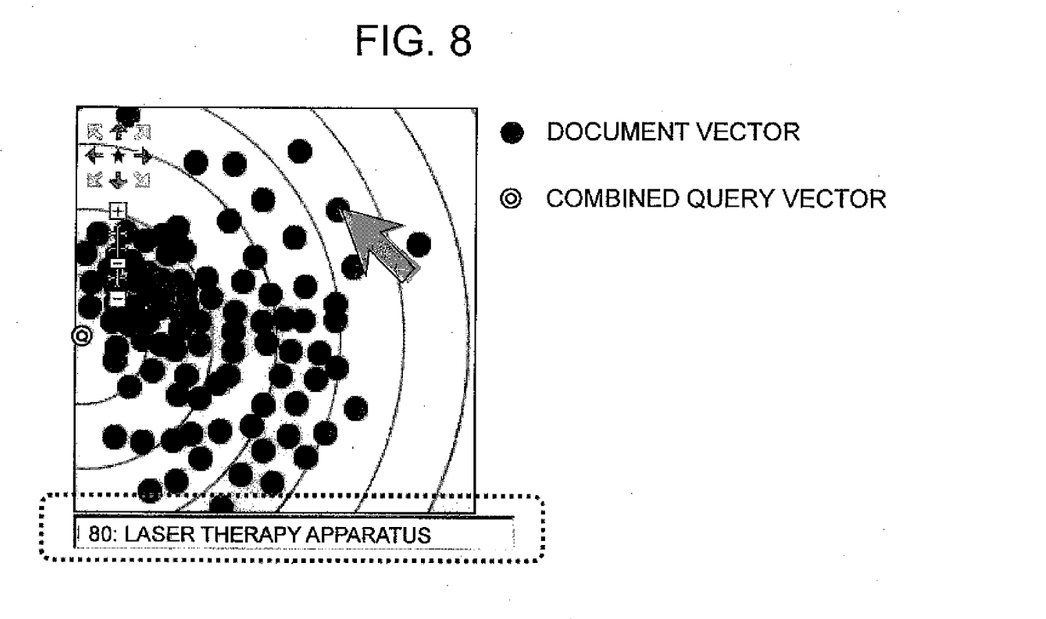
FIG. 8 is a view for explaining a method of designating a document on a map output by the document retrieving apparatus.
Figure 9:
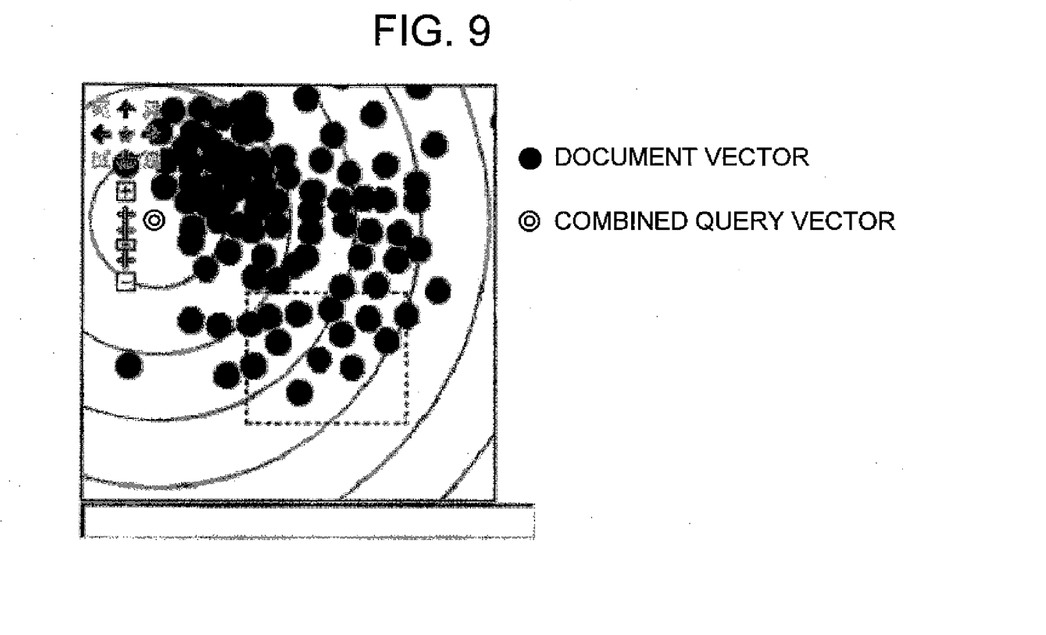
FIG. 9 is a view for explaining a method of designating an area on a map output by the document retrieving apparatus.

Respective steps of map creation routine S104 or S107 of FIG. 1 will be described with reference to FIGS. 3 and 7. Map creation routine S104 and map creation routine S107 of FIG. 1 are the same routine. When the user instructs map creation from the terminal apparatus, the two-dimensional map creator 22 reads out the document vector of each document based on the number list of the extracted document (document vector reading step S301) and computes similarity of the respective documents (document similarity computation step S302). For example, a scalar product of a document vector which has a weight of a word included in each document as an element may be computed and used as similarity of each document. The two-dimensional map creator 22 performs optimization computation for converting into an x coordinate and a y coordinates based on similarity between the respective document vectors (coordinates computation step S303). Optimization computation refers to computation which reduces a difference of a ranking criterion as further as possible when an inter-document similarity ranking criterion and a dimension on an real vector space (multi-dimension) are reduced to a two dimension. An algorithm for two-dimensional conversion is determined in consideration of either or both of relevance to the retrieval document and relevance between the document vectors of the extracted document. Similar documents may be disposed close to each other on the two-dimensional map. For example, a mutual distance between the extracted document and input sentences may be computed to create a distance table. A distance when the extracted document and the input sentences are converted into two-dimensional coordinates is computed to dispose documents so that an error with a distance of the distance table can be minimized. The two-dimensional map creator 22 creates a coordinates list of an x coordinate and a y coordinate of each document (coordinates list creation step S304) and the two-dimensional map based on the coordinates list (two-dimensional map creation step S305). The created two-dimensional map is displayed on a screen of the terminal apparatus (two-dimensional map display step S306). For example, the two-dimensional map creator 22 has a display engine and creates the two-dimensional map in which the document vectors extracted in retrieval document extraction step S206 through the search engine 21 are two-dimensionally disposed centering on a generated query vector generated in query vector generation step S204 through the search engine 21. FIGS. 8 and 9 illustrate screens of the terminal apparatus on which the two-dimensional map (a radar chart) created by the two-dimensional map creator 22 is displayed. A plot of a black circle denotes the document vector, and a plot of a double circle denotes the combined query vector. The radar chart is commonly used to compare sizes and amounts of a plurality of items. In the present embodiment, a result extracted by the retrieval is plotted on the radar chart according to a degree of relevance, so that a user can easily grasp a distance sense between retrieval target information and each document and a distance sense between the respective documents with high accuracy.

(Map Operation Routine)

Figure 4:
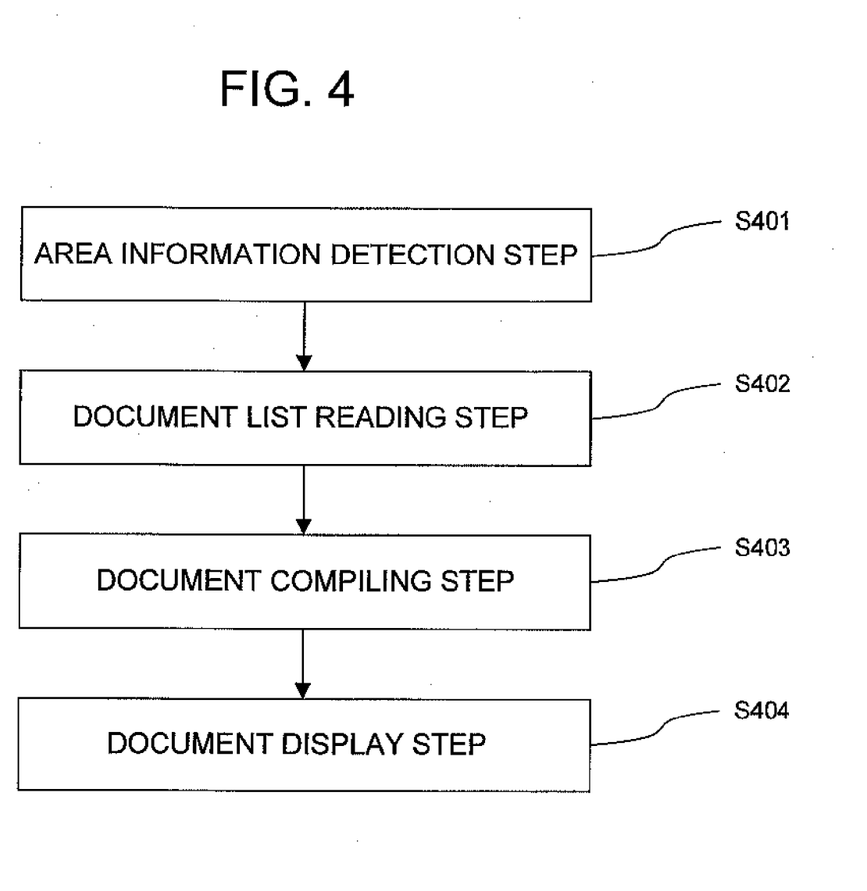
FIG. 4 is a view for explaining a map operation routine of the document retrieving apparatus.

Respective steps of map operation routine S108 of FIG. 1 will be described with reference to FIGS. 4 and 7. When the user designates a document on the map displayed on the screen of the terminal apparatus, a keyword or attribute information which is a feature of the document is displayed. For example, when the user designates a predetermined document through a mouse like an arrow representing a plot of FIG. 8, a title of the document is displayed at a position surrounded by a dotted line of FIG. 8. When displayed as described above, the user can easily grasp a position of a necessary document. Further, the user designates an area on the map displayed on the screen of the terminal apparatus. For example, the user designates a quadrangular area through the mouse like an area surrounded by a dashed line of FIG. 9. The number of areas to be selected is not limited to one but may be two or more. An area to be selected is not limited to a quadrangle and may be an area surrounded by a free curve. Further, an area including a document selected by the user may be automatically set. When displayed through the two-dimensional map as described above, the user can easily designate an area. The area information detector 23 detects area information representing the designated area on the displayed map (area information detection step S401). The document list reader 24 reads out a document list which is a list of documents corresponding to plots included in an area on the map from the area information detected by the area information detector 23 (document list reading step S402). The in-area information compiler 25 compiles the bibliographic information of each document included in the document list read by the document list reader (document compiling step S403). The document display controller 27 displays the bibliographic information compiled by the in-area information compiler 25 on the screen of the terminal apparatus (document display step S404).

(Map Retrieval Routine)

Figure 5:
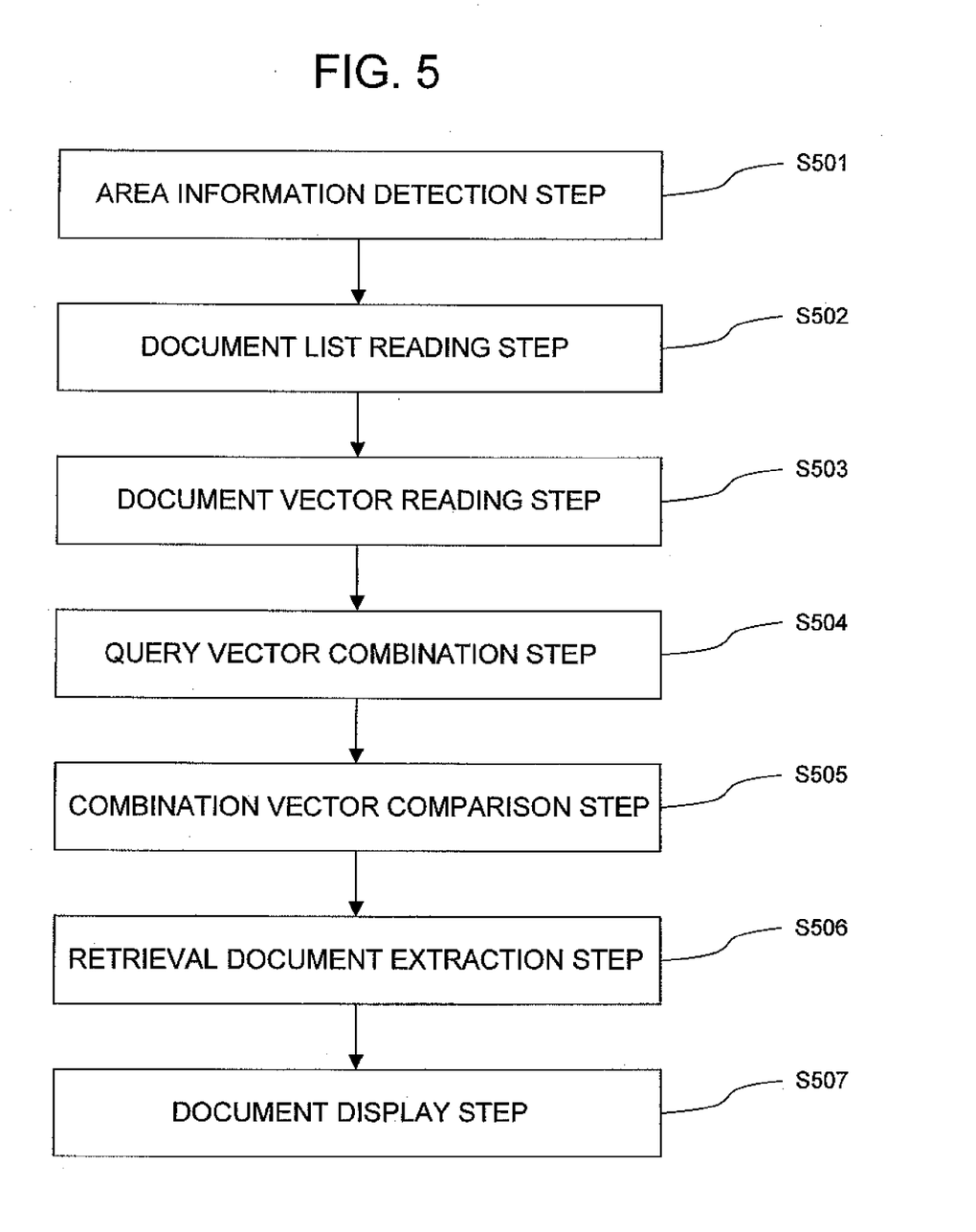
FIG. 5 is a view for explaining a map retrieval routine of the document retrieving apparatus.

Respective steps of map retrieval routine S106 of FIG. 1 will be described with reference to FIGS. 5 and 7. When the user designates a document on the map displayed on the screen of the terminal apparatus, a keyword or attribute information which is a feature of the document is displayed. For example, when the user designates a predetermined document through a mouse like an arrow representing a plot of FIG. 8, a title of the document is displayed at a position surrounded by a dotted line of FIG. 8. When displayed as described above, the user can easily grasp a position of a necessary document. Further, the user designates an area on the map displayed on the screen of the terminal apparatus. For example, the user designates a quadrangular area through the mouse like an area surrounded by a dashed line of FIG. 9. When displayed by the two-dimensional map as described above, the user can easily designate an area. The area information detector 23 detects area information representing a designated area on the displayed map (area information detection step S501). The document list reader 24 reads out a document list which is a list of documents corresponding to plots included in an area on the map from the area information detected by the area information detector 23 (document list reading step S502). The search engine 21 reads out the document vector of each document included in the document list read by the document list reader 24 from the information database 32 in which the document vectors are previously computed and registered (document vector reading step S503). Next, all of the read document vectors are combined into one combined query vector (query vector combination step S504). Next, the combined query vector is compared with the document vectors in the information database 32 (combination vector comparison step S505). Documents corresponding to the document vectors close to the combined query vector are extracted from among the compared document vectors in an order closest to the combined query vector (retrieval document extraction step S506). For example, a scalar product of the document vector and the combined query vector in which a weight of a word included in each document is used as an element may be used as an approximate distance from the combined query vector. Documents corresponding to the document vector close to the combined query vector is extracted by using information registered in the information database such as a keyword, a combination of keywords, and the presence of an information number, and a number list of the extracted documents is created. The document display controller 27 displays the bibliographic information of the document corresponding to the document vector extracted by the search engine 21 on the screen of the terminal apparatus (document display step S507). When map retrieval routine S106 is finished, it proceeds to map creation routine S107 and thereafter proceeds to processing instruction step S105.

Since the map retrieval routine is provided, the user can execute the document retrieval using visual information on the two-dimensional map and thus can easily retrieve the target document in a short time.

A related art in which a certain document is designated from among a plurality of documents which are listed and the retrieval is executed by narrowing a range based on the designated document has been disclosed (for example, see Patent Document 3). In the related art, the plurality of documents extracted by the first retrieval is listed based on a first input query and similarity to each document. That is, similarity to each extracted document is not considered. Even though two documents are adjacent to each other and displayed in the list, it does not mean that the two documents are similar to each other. In the related art, for the sake of the retrieval with the narrowed range, in order to determine a document to be designated, the user ultimately has to read contents of many documents.

In the embodiment of the present invention, similar documents are disposed adjacent to each other on the two-dimensional map by the two-dimensional map creator 22. When the user designates a predetermined document on the two-dimensional map, information (for example, a title) representing a brief content of the document is displayed. Therefore, the user can easily select one or more appropriate documents to be selected for the retrieval with the narrowed range. Therefore, a skilful technique is not necessary, and the accuracy and productivity of the retrieval can be improved.

Industrial Applicability

The document retrieving apparatus and the document retrieving method have been described hereinbefore. The document retrieving apparatus and the document retrieving method of the present invention can be applied to a patent search for retrieving past patent documents, a document search for retrieving document published in the past, and a document search for retrieving documents registered as data. Further, the document retrieving apparatus and the document retrieving method of the present invention can be applied to newspaper, articles, books, documents hold by an individual or a company, a document collected by scrolling contents on a web regardless of a form or a content.

The invention claimed is:

1. A document retrieving apparatus, comprising:
a processor, wherein the processor is configured to operate in accordance with executable instructions that, when executed, cause the processor to operate as:
an extractor receiving a search query for a target document and searching a database by using a threshold of similarity to the target document to extract a plurality of documents having larger similarity than the threshold, the similarity between the target document and the respective extracted documents being a first similarity;
a two-dimensional map creator, by using the extracted documents, computing similarity between the respective extracted documents, the similarity between the respective extracted documents being a second similarity, creating a single radar chart in accordance with the first similarity and the second similarity by plotting each of the documents on the single radar chart according to a degree of relevance based on a distance such that the lower the similarity, the further each document is apart from other document, and displaying the created radar chart;
an area designator which designates an area on the displayed single radar chart, the area covering at least two plots of a plurality of plots, each associated with the respective documents, in accordance with an input instruction;
an area information detector which detects area information representing the designated area for a retrieval with a narrowed range on the displayed map;
a document detector which detects documents corresponding to the at least two plots covered by the designated area;
a document list reader which reads out a document list which is a list of the detected documents;
an in-area information compiler which compiles bibliographic information of each document included in the document list read by the document list reader; and
a search engine which performs refine search by using a second query which is a compiling result compiled through the in-area information compiler.

2. A document retrieving method, comprising:
receiving a search query for a target document and searching a database by using a threshold of similarity to the target document to extract a plurality of documents having larger similarity than the threshold, the similarity between the target document and the respective extracted documents being a first similarity;
a two-dimensional map creation step, by using the extracted documents, computing similarity between the respective extracted documents, the similarity between the respective extracted documents being a second similarity, creating a single radar chart in accordance with the first similarity and the second similarity by plotting each of the documents on the single radar chart according to a degree of relevance based on a distance such that the lower the similarity, the further each document is apart from other document, and displaying the created radar chart;

an area designation step of designating an area on the displayed single radar chart, the area covering at least two plots of a plurality of plots, each associated with the respective documents, in accordance with an input instruction;

an area information detection step of detecting area information representing the designated area for a retrieval with a narrowed range on the displayed map;

a document detection step of detecting documents corresponding to the at least two plots covered by the designated area;

a document list reading step of reading out a document list which is a list of the detected documents;

a document compiling step of compiling bibliographic information of each document included in the document list read in the document list reading step; and a retrieval document extraction step of performing refine search by using a second query which is a compiling result compiled through the document compiling step.

3. A non-transitory computer readable storage medium for use in a computer, the computer readable storage medium being encoded with a computer program causing the computer to execute the retrieving method recited in claim 2.

\* \* \* \* \*